(12) United States Patent
Chary

(10) Patent No.: US 7,565,562 B2
(45) Date of Patent: Jul. 21, 2009

(54) CONTEXT BASED POWER MANAGEMENT

(75) Inventor: Ram V. Chary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 10/933,886

(22) Filed: Sep. 3, 2004

(65) Prior Publication Data
US 2006/0053311 A1 Mar. 9, 2006

(51) Int. Cl.
*G06F 1/32* (2006.01)

(52) U.S. Cl. .................... 713/324; 713/323

(58) Field of Classification Search ............ 713/310, 713/323, 324
See application file for complete search history.

(56) References Cited

U.S. PATENT DOCUMENTS

| | | | | | |
|---|---|---|---|---|---|
| 5,652,927 | A | * | 7/1997 | McIntyre | 396/108 |
| 5,675,810 | A | * | 10/1997 | Sellers | 713/323 |
| 6,718,474 | B1 | * | 4/2004 | Somers et al. | 713/322 |
| 6,802,016 | B2 | * | 10/2004 | Liu | 713/323 |
| 6,836,849 | B2 | * | 12/2004 | Brock et al. | 713/310 |
| 6,845,457 | B1 | * | 1/2005 | Mirov et al. | 713/322 |
| 6,968,468 | B2 | * | 11/2005 | Lam | 713/320 |
| 6,986,064 | B2 | * | 1/2006 | Yoshimoto et al. | 713/300 |
| 7,010,705 | B2 | * | 3/2006 | Lu | 713/300 |
| 7,120,911 | B1 | * | 10/2006 | Katayama | 718/102 |
| 7,146,513 | B2 | * | 12/2006 | Misaka et al. | 713/320 |
| 2001/0020940 | A1 | | 9/2001 | Nakazato et al. | |
| 2003/0158763 | A1 | * | 8/2003 | McKee | 705/7 |
| 2004/0003300 | A1 | | 1/2004 | Malueg et al. | |

FOREIGN PATENT DOCUMENTS

EP  1 355 223 A2  10/2003

OTHER PUBLICATIONS

"Advanced Configuration and Power Interface Specification Rev 2.0", Jul. 27, 2000, pp. 1-35, XP002273950, sections 1.6 and 1.7, pp. 4 and 5; sections 2.2 to 2.6, pp. 19 to 23; sections 3.1 and 3.2, pp. 25 to 27; sections 3.3 to 3.6, pp. 28 to 35.

"PCT International Search Report of the International Searching Authority", mailed Apr. 7, 2006, for PCT/US2005028958, 5 pgs.

* cited by examiner

*Primary Examiner*—Thuan N Du
(74) *Attorney, Agent, or Firm*—Buckley, Maschoff & Talwalkar LLC

(57) ABSTRACT

According to some embodiments, context information associated with a processing system is determined. It is then automatically arranged for a power state associated with the processing system to transition from a first power state to a second power state based on the context information.

15 Claims, 8 Drawing Sheets

US 7,565,562 B2

CONTEXT BASED POWER MANAGEMENT

BACKGROUND

A processing system consumes power as it operates. For example, a processing system associated with a mobile computer might consume power from a battery. As the performance of a processing system is improved (e.g., by increasing the speed of the processor, allowing wireless communication, providing a larger display, and/or executing more complex applications), the amount of power consumed by the processing system may increase. As a result, a battery may need to be re-charged more frequently, which might be annoying for a user. Note that increasing the size of the battery might be impractical (e.g., because it would make a mobile computer too large).

To conserve power, a processing system and/or a subsystem within the processing system may have a number of different power states. For example, the processing system or subsystem might operate in a higher-power state when it is actively being used and in a lower-power state during periods of relative inactivity (e.g., a hard disk drive might be transitioned to a lower-power state when it has not been accessed for five minutes). In some cases, however, a processing system or subsystem may not be transitioned to a lower-power state. For example, a subsystem might not be placed in a placed in a lower-power state even when a user is not executing any applications that require that subsystem.

DETAILED DESCRIPTION

Some embodiments described herein are directed to a "processing system." As used herein, the phrase "processing system" may refer to any apparatus that includes one or more processors. Examples of processing systems include a desktop Personal Computer (PC), a mobile computer, a workstation, a server, a set top box (e.g., associated with a digital television receiver), a wireless telephone, and a game system.

Figure 1:
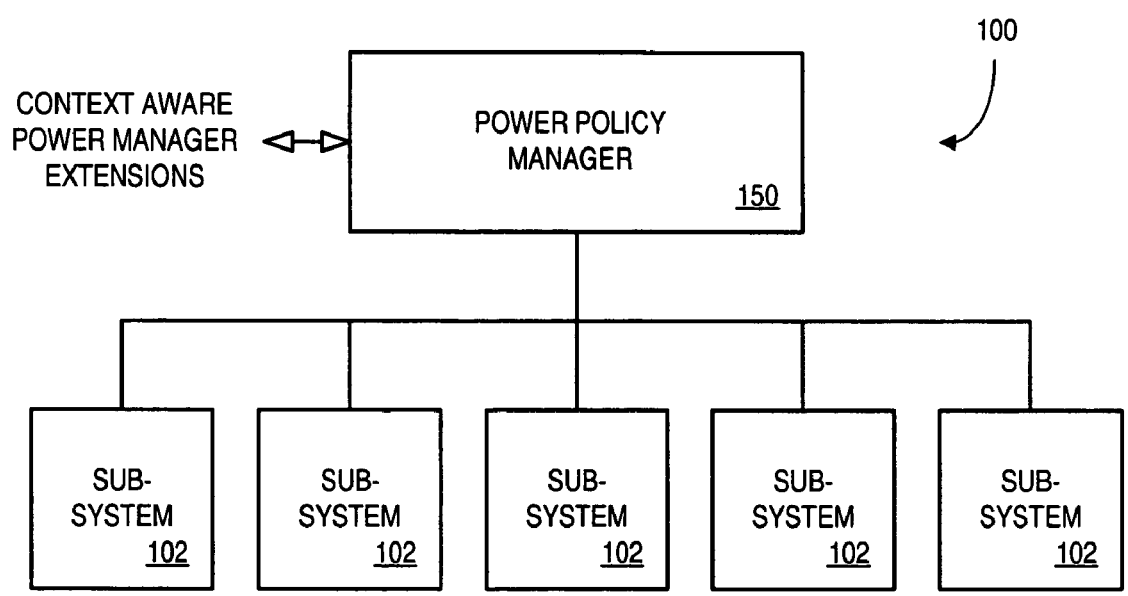
FIG. 1 is a block diagram of a processing system according to some embodiments.

For example, FIG. 1 is a block diagram of a processing system 100. In particular, the processing system 100 includes a number of subsystems 102. The subsystems 102 might include, for example, one or more processors, such as an INTEL® PENTIUM®IV processor. The processor may execute, for example, an operating system and/or a number of applications (e.g., a word processing application). Other examples of a subsystem include a hard disk drive, an audio subsystem, a display device, a communication device, and a printer.

The processing system 100 includes a power policy manager 150. The power policy manager 150 might, for example, be associated with an operating system that is being executed by a processor (e.g., one of the subsystems 102). The power policy manager 150 may place the processing system 100 (including any of the subsystems 102) in a number of different power states. For example, the power policy manager 150 might place a hard disk drive in a lower-power state when it has not been accessed for ten minutes.

According to some embodiments, the power policy manager 150 evaluates context information associated with the processing system 100, and arranges for a power state associated with the processing system 100 (e.g., including any of the subsystems 102) to transition from a first power state to a second power state based on the evaluation. According to some embodiments, the power policy manager 150 operates in accordance with one or more context aware power manager extensions.

Figure 2:
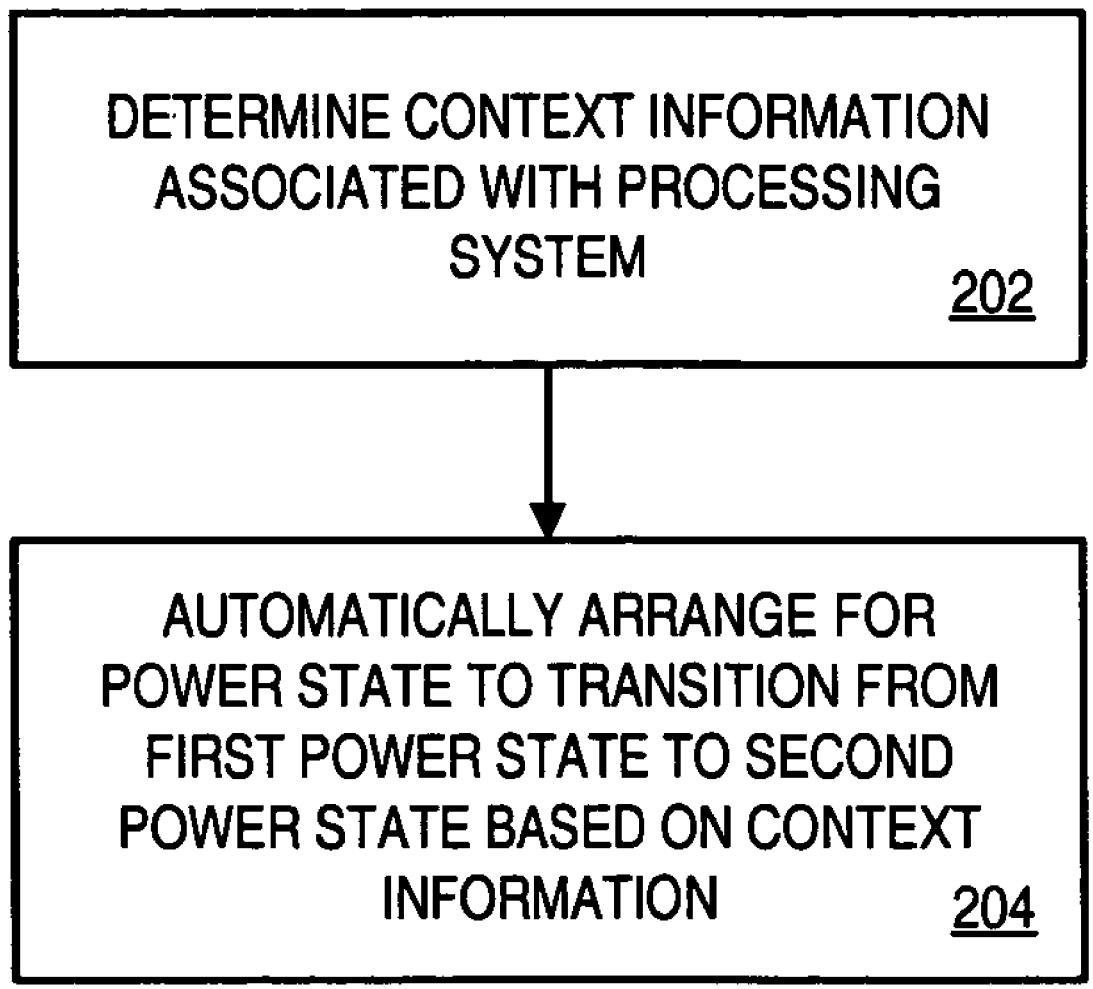
FIG. 2 is a flow chart of a method according to some embodiments.

FIG. 2 is a flow chart of a method according to some embodiments. The method of FIG. 2 may be associated with, for example, a processing system such as the one described with respect to FIG. 1. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine results in performance according to any of the embodiments described herein.

At 202, context information associated with a processing system is determined. As described with respect to FIGS. 4 and 6, the context information might comprise an evaluation of applications that are currently being executed or a sensed condition. Other examples of context information include a time of day, a day of week, and a date. For example, the context information might indicate whether or not it is currently between 9:00 AM and 5:00 PM on a work day.

The context information may also be based on a user usage pattern. For example, the context information might indicate that a first user of a hand-held device typically listens to a single song while a second user typically listens to many songs (and often takes thirty seconds to select his or her next song).

At 204, it is "automatically" arranged for a power state associated with the processing system to transition from a first power state to a second power state based on the context information. As used herein, the term "automatically" refers to an action that is performed without requiring an input from a user. Note that the power state might be adjusted directly by a power manager or by adjusting an existing power policy (e.g., reducing a time-out period).

For example, a laptop computer might automatically implement a first set of power management policies if it is currently between 9:00 AM and 5:00 PM on a work day and a second set of policies if it is not. In the case of a user usage pattern, for example, a hand-held device might automatically turn off an audio subsystem after a first user finishes listening to a song but not turn off the audio subsystem after a second user finishes listening to a song (e.g., because he or she is likely to select another song).

Figure 3:
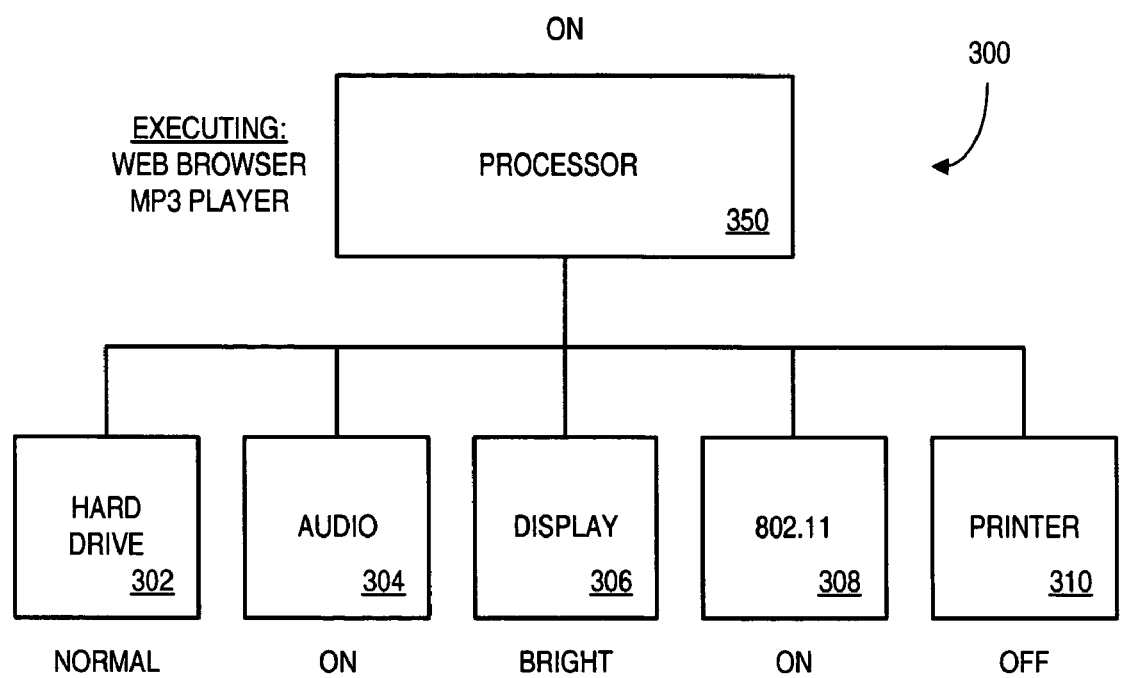
FIG. 3 is a block diagram of a processing system according to some embodiments.

FIG. 3 is a block diagram of a processing system 300 that includes a number of subsystems. In particular, the processing system 300 may include a hard disk drive 302 that might store applications and information files (e.g., songs and pictures). The processing system 300 may also include an audio subsystem 304. The audio subsystem 304 and hard disk drive 302 may be used, for example, to provide audio output in accordance with audio layer 3 of the Motion Picture Experts Group (MPEG) 1 protocol as defined by International Organization for Standardization (ISO)/International Engineering Consortium (IEC) document number 11172-1 entitled "Information Technology—Coding of Moving Pictures and Associated Audio for Digital Storage Media" (1993) (MP3).

In addition, the processing system 300 may include a display 306 (e.g., the screen of a hand-held device), a communication subsystem 308, and a printer 310. The communication subsystem 308 might, for example, exchange information via a communication network in accordance with third generation (3G) wireless, Global System for Mobile (GSM), and/or Bluetooth communications. By way of example, the communication subsystem 308 may transmit and/or receive information via a Wireless Local Area Network (WLAN) that operates in accordance with an Ethernet protocol and/or a Code-Division Multiple Access with Collision Avoidance (CDMA/CA) protocol, such as the one defined by Institute of Electrical and Electronics Engineering (IEEE) specification number 802.11 g (2003).

The processing system 300 also includes a processor 350 that may execute an operating system and one or more applications. For example, the processor 350 might execute the MICROSOFT® WINDOWS® XP operating system, the MICROSOFT® INTERNET EXPLORER 5.0® web browser, and a media player adapted to play MP3 songs.

The processor 350 or some other component may also include a power manager that operates in accordance with the Advanced Configuration and Power Interface (ACPI) Specification Revision 2.0b (October, 2002). For example, the processor 350 might be able to operate in a number of different "sleep" states, such as S0 (fully operational and consuming the most power); S1 (a low wake latency sleep state after which no system context is lost); and S2 (a low wake latency sleep state after which processor and system cache context needs to be restored). Moreover, frequency and voltage scaling may be used to reduce the amount of power consumed by the processor 350.

In addition to sleep states, the processing system 300 may be able to operate in various global states, device power states, processor power states, and/or performance states. Note that the ACPI specification defines global states G0 through G3, device power states D0 through D3 (and device performance states P0 through Pn within D0), and processor power states C0 through C3. That is, the performance and power requirements of various subsystems 302, 304, 306, 308, 310 may be individually controlled.

Figure 4:
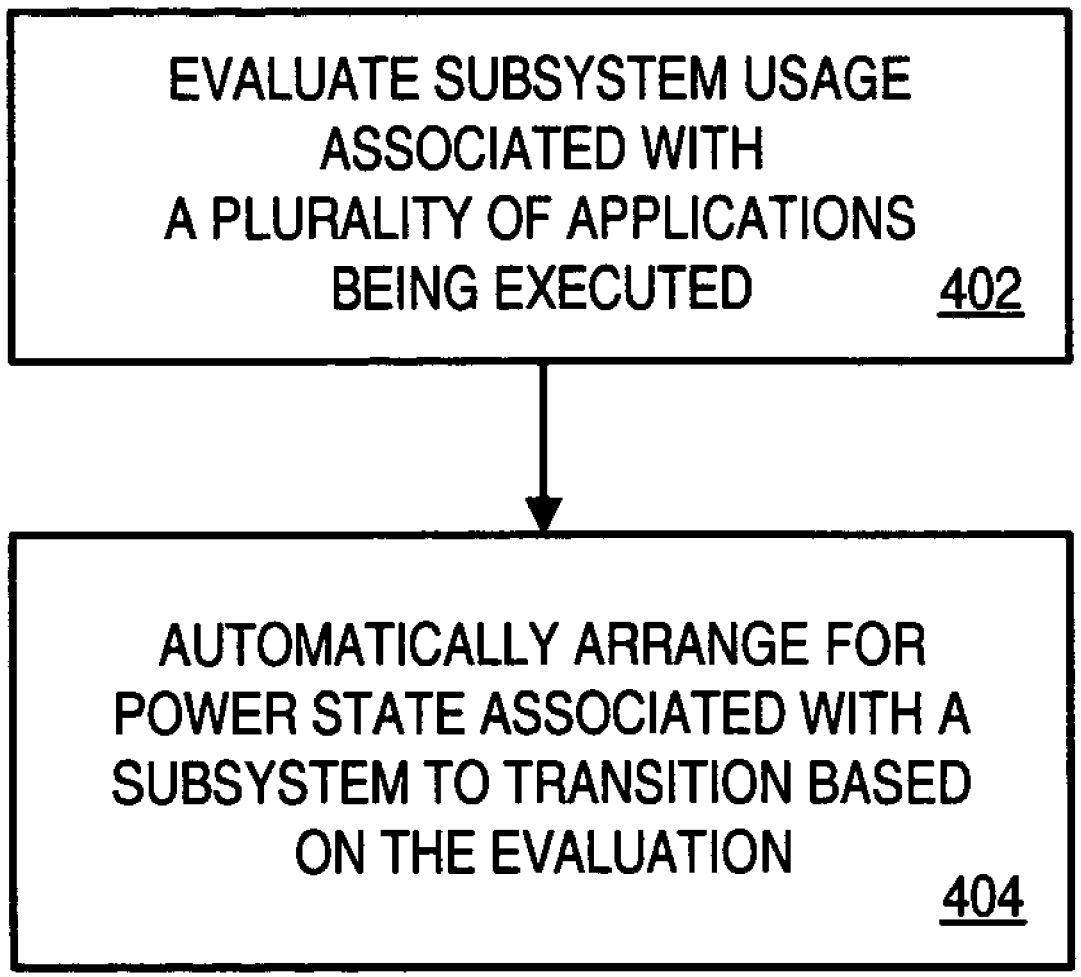
FIG. 4 is a flow chart of a method of evaluating applications that are currently being executed according to some embodiments.

FIG. 4 is a flow chart of a method of evaluating applications being executed according to some embodiments. At 402, subsystem usage associated with a plurality of applications being executed by a processing system is evaluated. Note that this evaluation might be performed, for example, periodically or when there is a change in the set of applications that are currently being executed (e.g., when a user launches a new program).

For example, referring again to FIG. 3, because the processor 350 is currently executing both a web browser and an MP3 player, the processor is currently in a higher-power state (e.g., no voltage or frequency scaling is being used). That is, a significant amount of processing may be required to support both applications and therefore the higher level of power consumption is justified.

Moreover, the hard disk drive 302 is in a normal state, the audio subsystem 304 is on (e.g., to play the MP3 files), the display 306 is bright (e.g., so the user can view web pages), and the communication subsystem 308 is on (e.g., to let the user access the Internet). Note that the printer subsystem 310 is off (e.g., because neither application is likely to use the printer 310), which may reduce the amount of power being used by the processing system 300.

At 404, it is arranged for a power state associated with a subsystem to transition from the first power state to the second power state based on said evaluation. For example, one or more subsystems may be transitioned to a lower-power state (e.g., to a lower-power ACPI device or performance state) when they are not likely to be used any application currently being executed.

Figure 5:
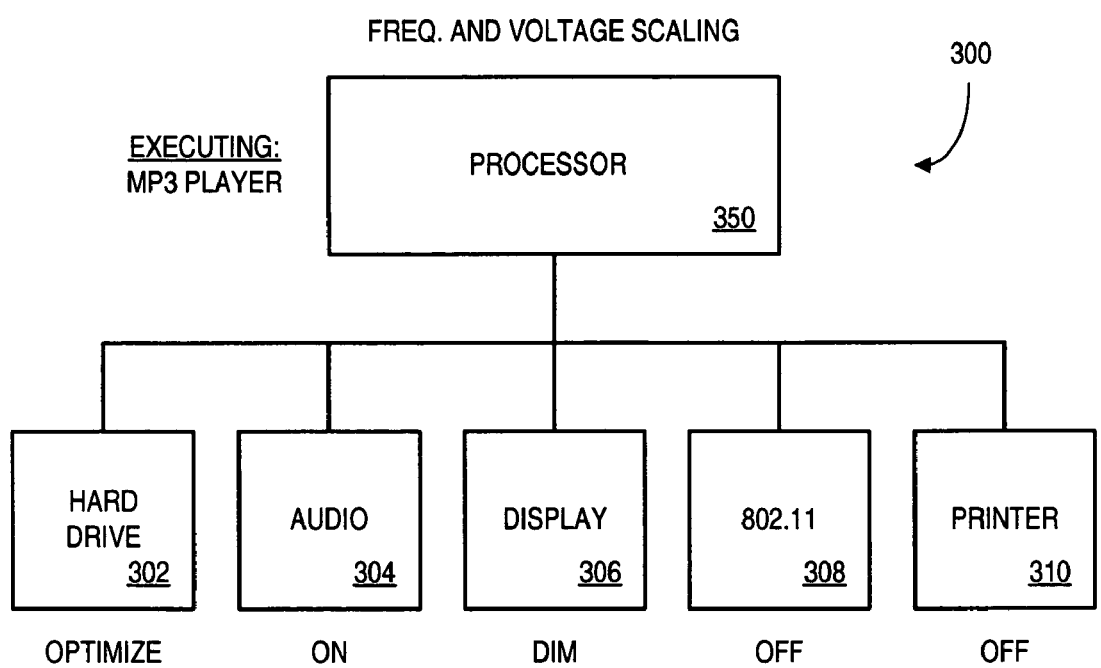
FIG. 5 is a block diagram of a processing system according to some embodiments.

For example, FIG. 5 is a block diagram of the processing system 300 after the user has closed the web browser (e.g., he or she is no longer accessing web pages). In this case, frequency and voltage scaling may be used to reduce the amount of power being consumed by the processor 350 (since the MP3 player alone requires less processing power).

Moreover, the performance of the hard disk drive 302 may be optimized to support the MP3 player. In this example, the power state of the audio subsystem 304 has not been changed (since the audio subsystem 304 is required by the MP3 player). The display 306 has been placed in a "dim" power mode (e.g., because the user is not likely to be looking at the display) and the communication subsystem 308 has been turned off completely in order to reduce the amount of power being used by the processing system 300. As a result, the life of a battery used to power the processing system 300 may be extended.

Figure 6:
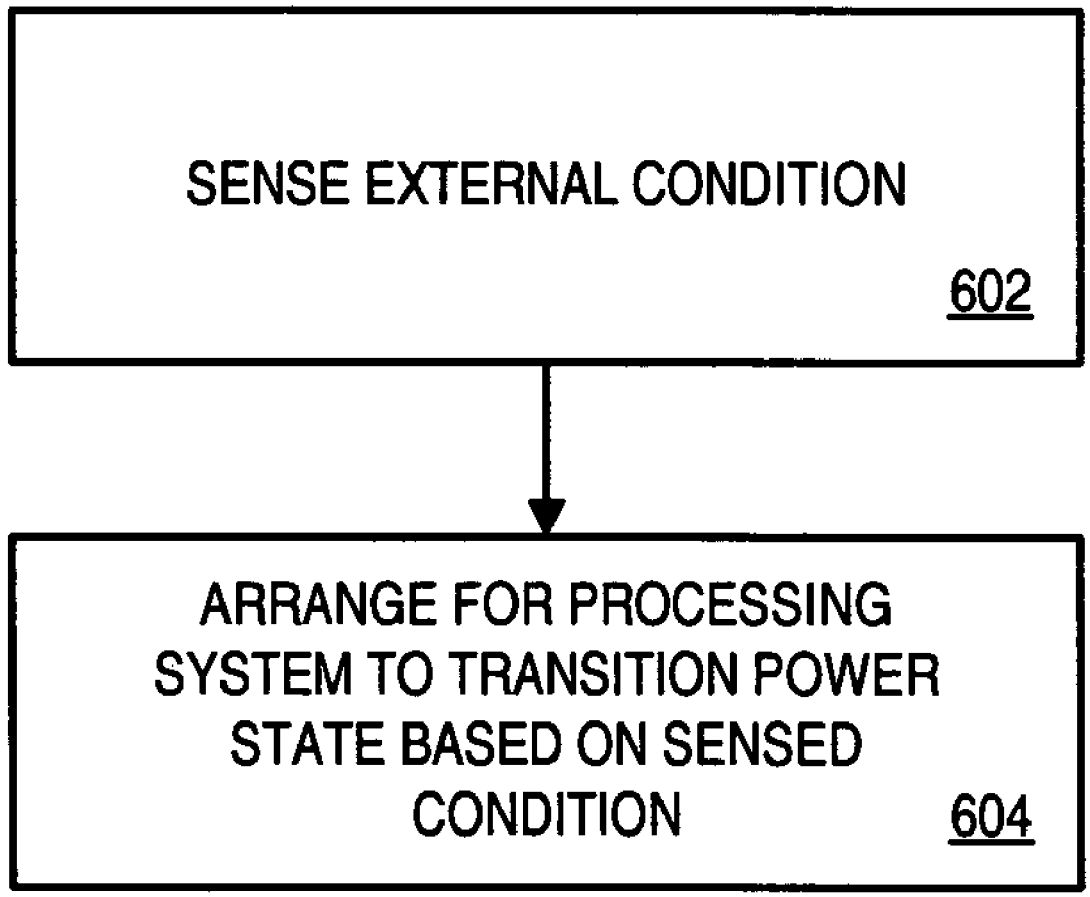
FIG. 6 is a flow chart of a method of sensing an external condition according to some embodiments.

In addition to evaluating the applications that are being executed, other context information may be used to adjust power states. For example, FIG. 6 is a flow chart of a method of sensing an external condition according to some embodiments. In particular, an external condition is sensed at 602, and it is arranged for a processing system to transition a power state at 604 based on the sensed condition.

The external condition might be, for example, an amount of ambient light. In this case, a processing system might use a light sensor to place a subsystem in a higher-power state when a user enters a dark room and turns on the light (e.g., because he or she is more likely to use the subsystem). As another example, a motion associated with a processing system may be detected and used to adjust a power state. For example, a hand-held computer might transition to a higher-power state when it is picked up by a user. As another example, a location associated with the processing system may be detected. For example, a wireless telephone subsystem might automatically transition to a lower-power state when the processing system detects that it is in the user's home or not within range of wireless service. As still another example, a location associated with a remote device might be detected. For example, a display subsystem on a laptop computer might be transitioned to a "bright" state when the laptop computer detects that a digital camera has been moved nearby (e.g., to let a user view pictures from the camera via a Bluetooth interface).

Figure 7:
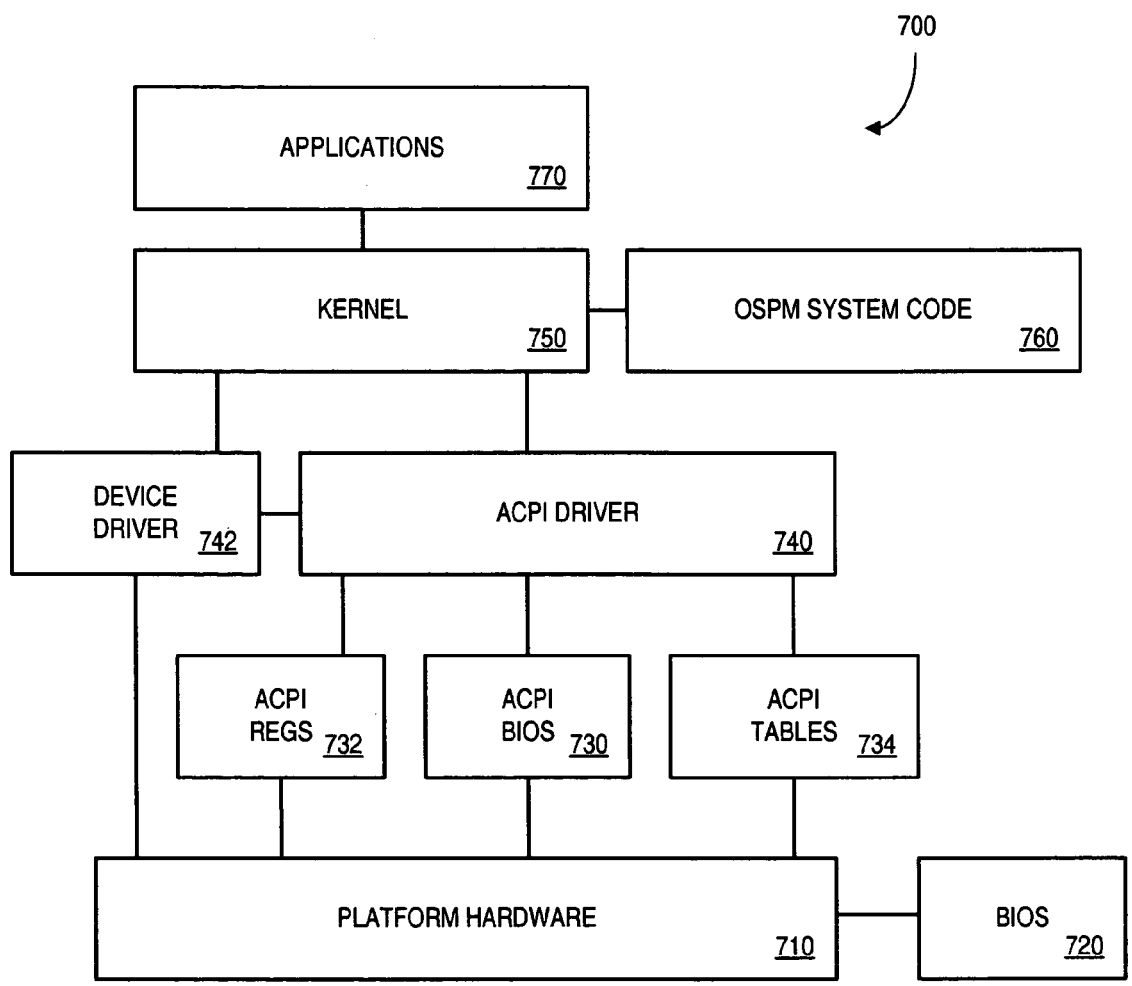
FIG. 7 is a block diagram of hardware and software power management components according to some embodiments.

FIG. 7 is a block diagram of hardware and software power management components that may be associated with an ACPI system 700 according to some embodiments. The system 700 includes platform hardware 710, such as a processor, a motherboard, and subsystems associated with the system 700. The system 700 also includes a Basic Input/Output System (BIOS) 720 that facilitates start-up operations. The platform hardware 710 may exchange information with an ACPI driver 740 via an ACPI BIOS 730, ACPI registers 732, and/or ACPI tables 734 (and these may be part of the BIOS data and contained with the BIOS in a persistent memory element, such as flash memory). The ACPI driver 740 (e.g., an integral part of an operating system) may in turn communicate with an Operating System (OS) kernel 750 and one or more device drivers 742. The kernel 750 may exchange information with OS Power Management (OSPM) code 760 and one or more applications 770 that are executing in the system 700.

To save power, the ACPI system 700 may enter a number of different power states. The various power states may represent, for example, states in which the system 700 consumes an increasingly lower amount of power and application 770 instructions are not being executed by a processor in the platform hardware 710 (e.g., ACPI sleep states S1 or S2). In other power states, the system 700 may appear to be "turned off" to a user, such as when in ACPI sleep state S3, also referred to as "suspend to RAM" and ACPI sleep state S4, also referred to as "hibernate."

One or more of the elements in the system 700 (or some other element not shown in FIG. 7) may act as a power manager. According to some embodiments, the power manager is associated with an Extensible Firmware Interface (EFI), such as an interface between the operating system and platform firmware. Note that implementing such an approach in BIOS and/or EFI might allow for improved power management without significant changes to an existing operating system.

According to some embodiments, the power manager simply decides whether or not a particular subsystem can be turned "off" based on the applications that are currently being executed. In this case, the power manager may perform a Boolean OR operation on subsystem requirements associated with a plurality of applications 770 that are currently being executed. The power manager may then arrange for a power state associated with system 700 (e.g., including any subsystem) to transition either "on" or "off" based on the result of the Boolean OR operation (e.g., the subsystem will be turned on when at least one application requires it).

In addition to simply turning a subsystem "on" or "off," the power manager may adjust a power state to any number of other levels (e.g., a display might be set to 20% brightness). For example, the following software algorithm might be used to provide power state transitions for a processing system that has n subsystems (e.g., devices) and that is able to execute j different applications:

```
While (forever) // in this example, the algorithm is being
executed periodically
{
    For Application 1 though j
    {
        If this application is new since last sampling
        {
            For Device 1 through n
            {
                Application[j].Device[i].Performance_State;
            }
        }
        Else
        {
            If application state has changed (e.g., to idle)
            {
                For Device 1 through n
                {
                    Application[j].Device[i].Performance_State;
                }
            }
        }
    }
    For Device[1..n] in the system
```

```
    {
        Device[i].Performance_State = MAX(Application
        [1..M].Device[i].Performance_State);
    }
}
```

That is, when a new application begins to execute, the algorithm will determine the minimum amount of resources that the application needs on a device-by-device basis (e.g., the new application requires at least 20% brightness for a display and a fully operational communication subsystem). Similarly, when an application stops executing the performance profile may be adjusted as appropriate (e.g., to 0% brightness and no need for a communication subsystem at all). The algorithm then selects the maximum value for each device and adjusts the power state of devices as appropriate.

Consider, for example, a processing system that is currently executing three applications. The first application requires a 40% brightness level, the second application requires a 90% brightness level, and the third application requires a 50% brightness level. In this case, the power manager may set the brightness level of a display subsystem to 90%. When the user closes the second application, the power manager may adjust the brightness level of the display subsystem to 50% (and thereby save power and increase the amount of time a battery will be able to power the system).

Figure 8:
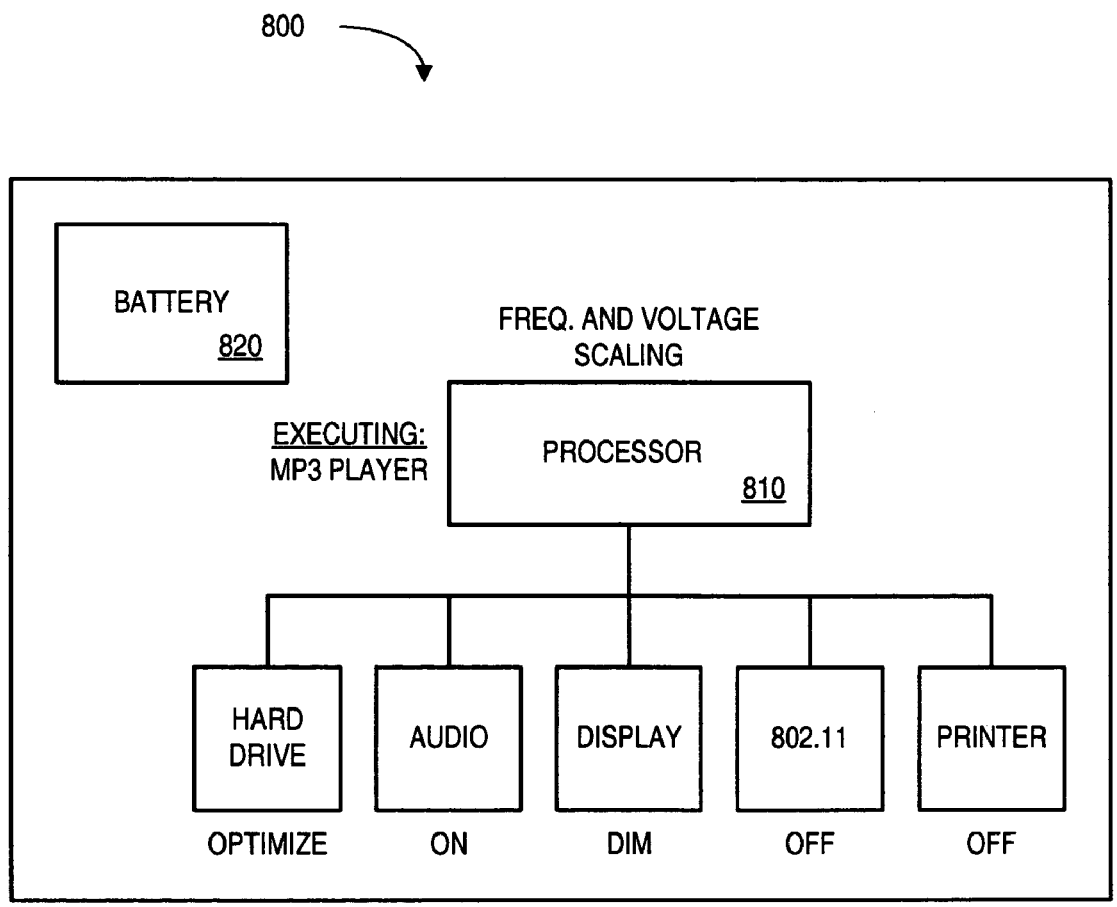
FIG. 8 illustrates a computer system according to some embodiments.

FIG. 8 illustrates a computer system 800 according to some embodiments. The computing system 800 may consume power from a battery 820 and operate in accordance with any of the embodiments described herein. For example, the computing system might include a processor 810 that adjusts a powers state associated with a subsystem based on context information (e.g., applications that are running and/or an external condition). Note that the subsystem being adjusted could, according to some embodiments, be the processor 810 itself.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although ACPI power states have been used herein as an example, embodiments of the present invention may be associated with any type of lower-power state. Moreover, although specific components have been described as performing specific functions, any of the functions described herein might be performed by a software application, a hardware device, an operating system, a driver, and/or a BIOS.

The several embodiments described herein are solely for the purpose of illustration. Persons skilled in the art will recognize from this description other embodiments may be practiced with modifications and alterations limited only by the claims.

What is claimed is:

1. A method, comprising:

automatically evaluating subsystem usage associated with a plurality of subsystems of a processing system based on a historical pattern of how a subsystem is used;

sensing a condition generated external to the processing system, wherein the generation of the condition is associated with a potential usage of one of the plurality of subsystems by a user; and automatically arranging for a power state associated with the one of the plurality of subsystems to transition from a first power state to a second power state based on said evaluation and external condition, wherein a second one of the plurality of subsystems is to remain at the first power state.

2. The method of claim 1, wherein said arranging comprises:

arranging for a power state associated with a subsystem to transition from the first power state to the second power state based on said evaluation.

3. The method of claim 2, wherein at least one of the subsystems comprises at least one of: (i) a processor, (ii) a hard disk drive, (iii) an audio subsystem, (iv) a display device, or (v) a communication device.

4. A method, comprising:

automatically determining context information associated with a processing system that includes a number of subsystems, wherein the context information is associated with a historical pattern of how a first subsystem is used and at least one of: (i) a time of day, (ii) a day of week, or (iii) a date;

sensing a condition generated external to the processing system, the generation of the condition being associated with a potential usage of the processing system by the user; and automatically arranging for a power state associated with the first subsystem to transition from a first power state to a second power state based on the context information and external condition, wherein a second one of the number of subsystems is to remain at the first power state.

5. An apparatus, comprising:

a number of subsystems;

a storage device to store information associated with a historical pattern of how subsystem are used;

a processor; and a power manager to: (i) automatically evaluate context information associated with the apparatus, wherein the context information is based at least in part on an evaluation of subsystem requirements associated with a plurality of applications currently being executed by the processor wherein the evaluation is based on the stored historical pattern and a sensed, (ii) automatically arrange for a power state associated with a subsystem of the apparatus to transition from a first power state to a second power state based on the evaluation, wherein a second subsystem is to remain at the first power state.

6. The apparatus of claim 5, wherein at least one of the subsystems comprises at least one of: (i) a processor, (ii) a hard disk drive, (iii) an audio subsystem, (iv) a display device, or (v) a communication device.

7. The apparatus of claim 5, wherein the apparatus further includes an ambient light sensor to sense the ambient light.

8. The apparatus of claim 5, wherein the power state is an advanced configuration and power interface specification power state and is associated with at least one of: (i) a global state, (ii) a device power state, (iii) a sleep state, (iv) a processor power state, or (v) a performance state.

9. The apparatus of claim 5, wherein the power manager is an operating system power policy manager adapted to use context-aware power manager extensions.

10. A computer system, comprising:

a number of subsystems;

a processor;

a battery to supply power to the processor; and a power manager to: (i) determine minimum subsystem requirements associated with a plurality of applications being executed by the processor, (ii) sense a motion condition generated external to the computer system, the motion being associated with the computer system being moved, and (iii) automatically arrange for a power state associated with a subsystem to transition from a first power state to a second power state based on a largest minimum subsystem requirement for that subsystem and the external motion condition, wherein a second subsystem is to remain at the first power state.

11. The computer system of claim 10, wherein at least one of the subsystems comprises at least one of: (i) a processor, (ii) a hard disk drive, (iii) an audio subsystem, (iv) a display device, or (v) a communication device.

12. The computer system of claim 10, wherein the power state is an advanced configuration and power interface specification power state and is associated with at least one of: (i) a global state, (ii) a device power state, (iii) a sleep state, (iv) a processor power state, or (v) a performance state.

13. An article, comprising:

a storage medium having stored thereon instructions that when executed by a machine result in the following:

automatically determining context information associated with a processing system that includes a number of subsystems, wherein the context information is based at least in part on an evaluation of subsystem requirements associated with a plurality of applications currently being executed by the processor, automatically sensing a location condition created external to the processing system, the creation of the location condition being associated with a range of a wireless service; and automatically arranging for a power state associated with a subsystem of the processing system to transition without user input from a first power state to a second power state based on the context information and external location condition, wherein a second subsystem is to remain at the first power state.

14. The article of claim 13, wherein the context information is further associated with a user usage pattern along with at least one of: (i) a time of day, (ii) a day of week, or (iii) a date.

15. The article of claim 13, wherein the external location condition is further associated with at least one of: (i) a location associated with the processing system, or (ii) a location associated with a remote device.

* * * * *